June 8, 1943.   G. B. SAYRE   2,321,252
MECHANISM FOR LOADING AND EMPTYING MOLDING PRESSES
Filed Nov. 12, 1938   3 Sheets-Sheet 1

INVENTOR
GORDON B. SAYRE
BY
ATTORNEY

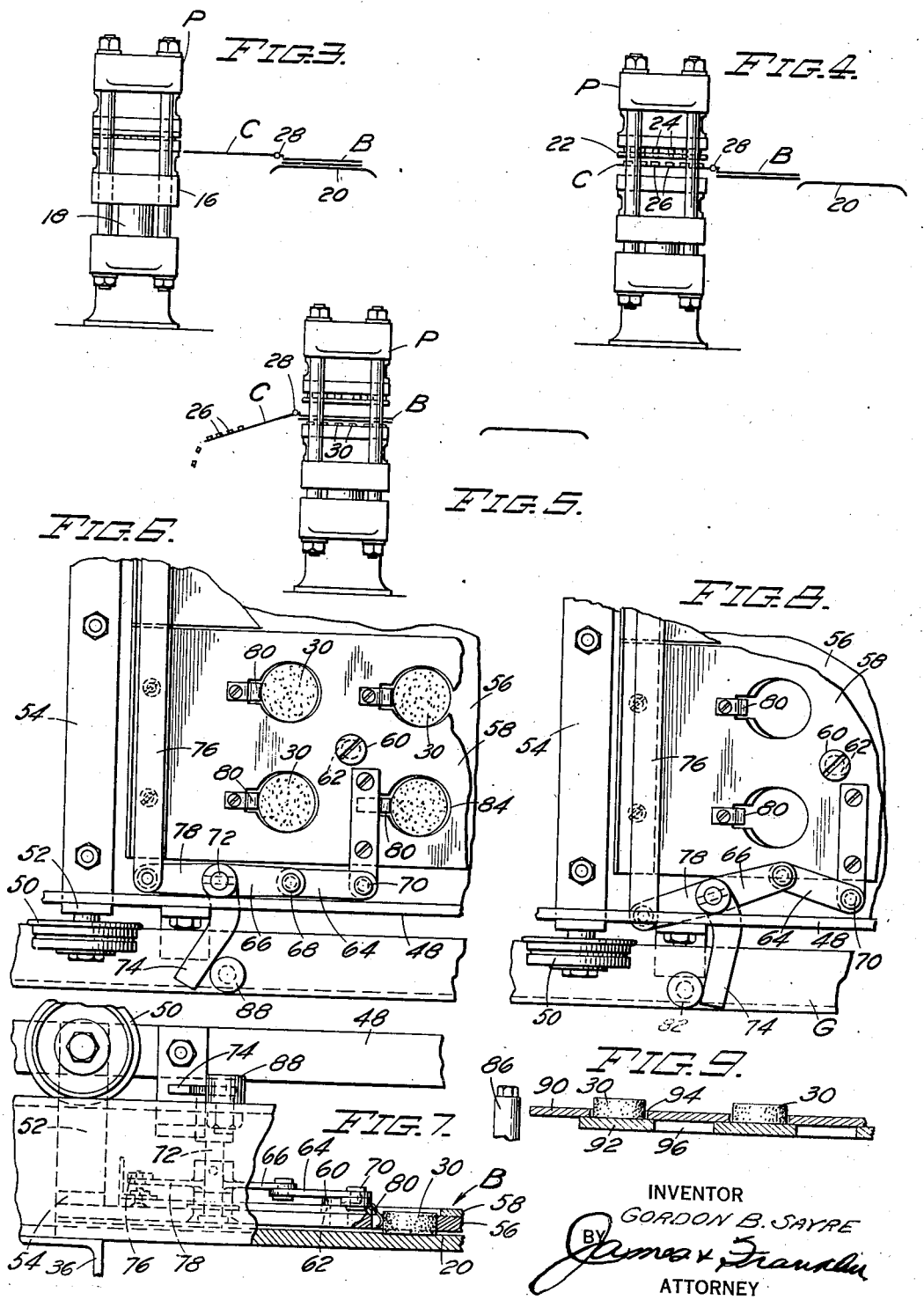

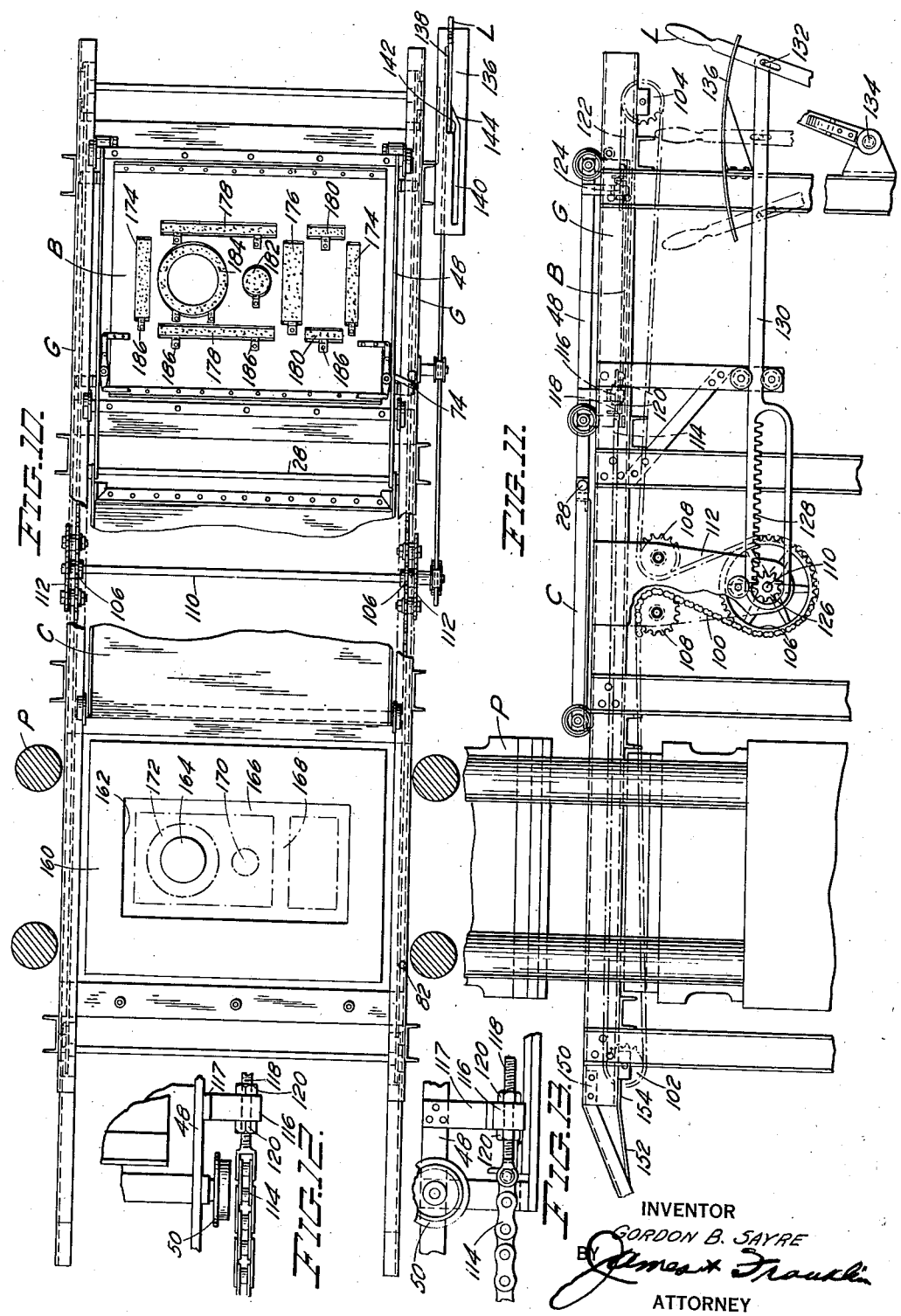

Patented June 8, 1943

2,321,252

UNITED STATES PATENT OFFICE 2,321,252

MECHANISM FOR LOADING AND EMPTYING MOLDING PRESSES

Gordon B. Sayre, Brooklyn, N. Y., assignor to Boonton Molding Company, Boonton, N. J., a corporation of New Jersey Application November 12, 1938, Serial No. 239,934

20 Claims. (Cl. 18—30)

This invention relates to molding, especially the molding of plastics, and more particularly to mechanism for loading and emptying molding presses.

Small articles, for example bottle caps, are molded in large numbers under heat and pressure in a multiple cavity mold. There may, for example, be 144 cavities in a single mold. In accordance with the prior practice, the operator of the press inserts a large card or board between the halves of the mold as the press opens, and the molded articles stripped from the upper half of the mold fall onto this board which is then removed from the press and dumped into a suitable box or bin receiving the molded articles. The molding material is preliminarily formed under high pressure into pills or tablets containing the desired measure of molding material. The operator must then insert these pills into the numerous mold cavities, whereupon the press is again closed.

The object of my invention is to generally improve molding practice, and more particularly, to facilitate loading and unloading of a molding press by associating appropriate mechanism for that purpose with each molding press. More specifically, the object of my invention is to provide such mechanism. A further object is to minimize the necessary opening and closing movement of the press. Another object is to facilitate the molding of complex forms requiring a variety of differently shaped and placed pills.

To the accomplishment of the foregoing general and other more specific objects which will hereinafter appear, my invention comprises the catchboard, pillboard and guide elements, and their relation one to the other, as hereinafter are more particularly described in the specification and sought to be defined in the claims. The specification is accompanied by drawings, in which:

Fig. 1 is a plan view of mechanism embodying features of my invention;

Fig. 2 is a side elevation of the same;

Fig. 3 is a schematic view explanatory of the invention with the boards in retracted or first position;

Fig. 4 is a similar view with the boards in intermediate or second position;

Fig. 5 is a similar view with the boards in discharging or third position;

Fig. 6 shows a section of the pillboard in plan to enlarged scale;

Fig. 7 is a partially sectioned side elevation of the same;

Fig. 8 is a view similar to Fig. 6, but showing the pillboard in the third or release position;

Fig. 9 is explanatory of a modified construction for the pillboard;

Fig. 10 is a partially sectioned plan view of a modification of the invention in which the boards are operated through chain and sprocket mechanism;

Fig. 11 is a side elevation of the mechanism of Fig. 10;

Fig. 12 shows the chain connection in plan; and

Fig. 13 shows the same in elevation.

Referring to Figs. 1 and 2 of the drawings, the press generally designated P has associated with it a pillboard B and a catchboard C movable on rails or guides G. The guides G are dropped at one side of the press, as is indicated at 12 in Fig. 2, but extend horizontally on the opposite side of the press, as is indicated at 14.

Referring now to Figs. 3, 4 and 5 of the drawings, the rails or guides G have been omitted in order to more clearly show the location of the catchboard and pillboard and their relation to the press P. These figures are, of course, merely diagrammatic, and are offered by way of explanation of the operation of the mechanism. In Fig. 3 the press is shown closed, the lower platen 16 having been moved upwardly by ram 18. The boards B and C are in the retracted or first position, both boards being located at one side of the press. At this time the pillboard B is preferably disposed over a stationary table 20, in order to facilitate loading the pillboard with a supply of pills.

In Fig. 4 the press is shown open. During opening of the press, the boards have been moved to the left to the second or intermediate position, and at this time the catchboard C is disposed in the press. As the press opens, a suitable stripper plate 22 is moved downwardly on the molding pins 24, thereby stripping the molded articles, for example bottle caps, from pins 24 so that they fall onto the catchboard C, as is indicated at 26. The pillboard B preferably moves along with the catchboard C, the two boards being connected together, as by means of a pivotal connection indicated at 28.

Referring now to Fig. 5, the boards are now moved further to the left to the third or discharge position. At this time the catchboard C is tilted downwardly, thereby automatically dumping the molded articles 26, and the pillboard B is disposed in the press. Suitable stops function to stop the pillboard B with the tablets in registration with the mold cavities. Moreover some stops may additionally function to cause release of the pills from the pillboard so that they fall into their respective mold cavities, as is indicated at 30. The empty boards then move back toward the right to the first position shown in Fig. 3, and the press is closed. While the press is closed, the pillboard B may be again loaded with pills.

Considering the arrangement in greater detail, and reverting to Figs. 1 and 2, the guides G are channel irons of U-shaped section with the flanges turned inwardly. The flat or outer sides of the rails are preferably disposed just inside the pillars 32 of the press. The rails are supported on suitable upright supports or legs 34 which extend downwardly to the floor. They are held in properly spaced and parallel relation by cross members 36. The catchboard C consists of a sheet or panel 38 of suitable hard material such as Bakelite. It is mounted in a frame made up of angle irons, the iron 40 at the leading edge being disposed beneath board 38 so that there will be no obstruction to free sliding discharge of the articles from the board when the board is tilted at the end of the rails. The iron 42 at the trailing edge is preferably disposed above the board 38 and the flanges of the side members 44 also preferably project above the board 38. In this way a protective ledge is provided around three edges of the board, while the fourth or leading edge is open.

The catchboard is provided with flanged wheels 46 which ride on the guides G. The side members 44 extend rearwardly to a rod 28 which acts as a pivotal connection between the catchboard C and the pillboard B. Rod 28 passes through side members 48 which also carry flanged running wheels 50. These in turn carry the pillboard B, but the pillboard is preferably disposed at a substantially lower level than the catchboard C. The pillboard is therefore suspended from the side members 48 and the wheels 50 by means of straps 52, which are preferably connected by or may be bent upwardly from the ends of cross straps 54.

Referring now to Fig. 7, the pillboard is a laminated board made up of a lower panel 56 and an upper panel 58, these panels being made of any suitable material such as Bakelite and being so mounted as to afford a slight relative movement of one panel relative to the other. Both panels are apertured to receive the pills 30. The lower panel 56 is secured directly to the cross straps 54, and may therefore be considered the main panel which is movable with the carriage or wheels 50. This panel is disposed slightly above the table 20 and the latter may be used as a stop when pressing the pills 30 into the pillboard. The table 20 should therefore be smooth in order not to obstruct movement of the pills with the pillboard over the table. I prefer to make the table, like the other boards, out of Bakelite or similar synthetic resinous material, for it provides a hard, smoothly polished rigid plane surface.

The upper panel 58 is secured to the lower panel by means of screws such as the screw 60 (Fig. 6), said screws passing through slots 62 in panel 58 and being received in the lower panel 56. In this way the relative movement of the panels is limited to the length and to the direction of the slots, which, in the present case, is in the direction of the guide rails. The movement of panel 58 relative to panel 56 may be controlled by means of a toggle mechanism comprising links 64 and 66 pivotally connected to one another at 68, the other end of link 64 being connected to panel 58 through pivot 70.

Link 66 is connected to the main or bottom panel 56 by means of an upright spindle 72 which is fixedly secured to link 66, and at its upper end is fixedly secured to a control arm 74.

Reverting to Fig. 1, equal movement of the upper panel at both sides of the pillboard is preferably assured by duplicating the toggle mechanism 64, 66 at the opposite side of the pillboard, as is shown at 64', 66'. The toggles are moved together by means of a link 76 connecting extensions 78 and 78' on links 66 and 66'.

Reverting to Figs. 6, 7 and 8, the upper panel 58 carries a small spring 80 at each of the openings, the lower end of the spring being so positioned as to bear yieldingly against a pill 30 in the pillboard, as is shown in Figs. 6 and 7. When the pillboard travels along the guide rails into the press, it reaches a stop 82 on the guide rail which tilts arm 74 so as to "break" or release the toggle 64, 66, thus moving the upper panel 58 to the left relative to lower panel 56. This moves the springs 80 away from the pills, thereby permitting the same to fall freely out of the pillboard. It will be understood that the holes in the upper panel 58 are oversized and permit the necessary release movement of the spring 80 without the opposite edge 84 of the aperture reaching the pill. Of course, these openings in the upper panel may be made much larger than is indicated in the drawing, for the sole function of the upper panel is to carry the springs 80.

The operation will be clear from Fig. 1, in which the first position of the boards is shown in solid lines, while the third position is shown in broken lines. In the broken line position B' of the pillboard, it will be seen that the toggle mechanism has been broken by the operation of stop 82 on arm 74. It may be mentioned that stop 82 need not be and in fact is not relied upon to act as a stop for the main movement of the boards, or in other words, is not relied upon to establish registration of the pillboard with the die cavities in the third position. Instead, a series of stops 86 is provided, these projecting upwardly from the end cross-channel 36. The main panel 56 and the cross strap 76 supporting the same all bear directly against the upwardly projecting stops 86 when the pillboard reaches its third position. There is no interference with the movement of the catchboard because the catchboard is located at a higher elevation and passes freely over the comparatively low stops 86.

When the boards are moved back to the first position, the arm 74 strikes another stop 88 which functions to straighten the toggle 64, 66 and thus close the pillboard, as is shown in Figs. 6 and 7. The pills 30 are then pressed into the pillboard against the resistance of the springs 80. This resistance is slight and no difficulty is encountered in pressing the pills into position against the rounded contour of the lower or free ends of the springs. However, it will be understood that, if desired, the pillboard may be left in released position during the pill-loading operation. Specifically, it is merely necessary to stop the pillboard a little ahead of the stop 88; to then load the pillboard with the pills; and to thereupon pull the pillboard slightly toward the right or against the stop 88 in order to close the pillboard before moving the same toward the left or away from the table 20 beneath the pillboard. Still another way to accomplish the same result is to simply omit the stop 88, the movement of the pillboard being limited by the main stops 89 projecting inwardly from the guide rails G, as shown in Fig. 1. After loading the pillboard with a supply of pills, the arm 74 is then pulled manually to close the pillboard so that it will hold the pills during their movement to the press.

It is not essential to make the pillboard of the type so far described. Referring to Fig. 9, the pillboard may more simply be made up of upper and lower panels 90 and 92 which are respectively apertured at 94 and 96 to receive the pills 30. These panels are relatively movable to bring the apertures 94 and 96 out of registration so that the lower panel 92 acts as a bottom for the apertures in the upper panel 90. The pills 30 are loaded in the pillboard by simply placing the same in the apertures 94. No table is needed beneath the pillboard, and no springs are employed. When the pillboard travels into the press and strikes the stops 86, the upper panel is stopped, while the lower panel continues moving until the two panels are brought into registration, whereupon the pills drop through the openings 96 into the die cavities.

The advantage of the more complicated pillboard previously described is that it requires only a slight relative movement of the upper and lower panels; it insures dropping of the pills into the mold cavities in horizontal position; it will handle pillls of different shape and dimension, as will be described later in connection with Fig. 10; and it is of particular advantage if the pills are to be loaded into the pillboard from the bottom in accordance with my further invention in this field, disclosed in my co-pending application Serial No. 247,017, filed December 21, 1938, in accordance with which a tableting or pill-making machine forms a direct part of the press-loading mechanism.

As so far described, the boards are simply moved or pushed along the guide rails. If desired, special mechanism may be provided to produce the desired movement. Thus, referring to Figs. 10 and 11, the pillboard B and catchboard C run on guide rails G just as has already been described, but in this case the boards are moved by chain and sprocket mechanism which is itself operated by means of a control lever L. In this way the boards may be moved by an operator stationed at one point. This may be the loading station at which the pills are loaded into the pillboard, and, if desired, the control valves of the press P may be brought to the same point, in which case all operations may be controlled at a single station.

Except for the additional chain and sprocket mechanism for moving the boards, the arrangement of Figs. 10 and 11 is substantially identical with that previously described, and the description will therefore not be repeated. A sprocket chain 100 is provided the upper portion of which is located within the channel of the guide rail G. The sprocket chain extends to idler sprockets 102 and 104 at the ends of rail G. The chain is driven by means of a drive sprocket 106, and the chain is guided about drive sprocket 106 by means of additional idlers 108. Drive sprocket 106 is mounted on a shaft 110 carried in bearings 112 depending from guide rails G.

The upper portion of the chain is connected to the boards in order to move the same. More specifically, the chain is connected to the pillboard B, the movement of which must be accurate. The catchboard C is merely moved along with the pillboard B due to the pivotal connection therebetween. The connection between the chain and the pillboard is preferably made adjustable, the adjustment amounting to at least the pitch of the chain, for a movement or adjustment greater than the pitch of the chain may, of course, be accommodated by movement of the chain on the drive sprocket 106 by one or more teeth, as desired. The adjustable connection is best shown in Figs. 12 and 13. One end 114 of the chain is connected to a block 116 secured to a bracket 117 depending from side bar 48 of the carriage. The connection is by means of a threaded screw 118 and adjusting nuts 120. Similarly, the other end 122 (Fig. 11) of the chain is connected to a block 124 at the other end of the pillboard carriage. It will be evident that the tension of the chain may be increased by changing the adjusting nuts 120 to shorten the bolts 118, and vice versa. It will also be evident that the position of the pillboard relative to the chain may be adjusted by loosening one adjusting bolt and tightening the other. In this way the pillboard may be suitably adjusted to insure registration with the die at the end of its travel.

Driving sprocket 106 is turned by lever L through appropriate rack and gear mechanism. Specifically, shaft 110 carries a pinion 126 which meshes with a rack 128 formed on a rod 130 which is connected to lever L by means of a pin and slot connection 132. Lever L is pivotally mounted at 134. The upper end of the lever moves in a slotted guide 136. This has a stepped slot, there being a first slot 138 and a sidewardly displaced second slot 140. A stop shoulder 142 is provided between slots 138 and 140 in order to stop the lever L during its forward movement. In this way the movement of the boards is divided into two parts, that which brings the boards to the second position, and that which brings them to the third position. The connection between the slots 138 and 140 on the return movement of the lever is preferably a sloping connection, as is indicated at 144, so that the lever may be moved all the way back in a single movement.

While not at all essential, I may explain that I have found it of advantage to so proportion the rack and pinion mechanism and the slots 138 and 140 that movement of lever L in slot 138 produces one revolution of shaft 110, while movement of lever L in slot 140 produces another revolution of shaft 110. The sprocket wheel 106 is selected with a periphery equal to the desired length of movement of the boards for each of the two steps. In other words, when driving sprocket 106 turns one full revolution, the boards are moved from the first to the second position, and when the driving sprocket is turned another full revolution, the boards are moved from the second to the third position.

The advantage of this arrangement is that the mechanism may be readily accommodated to presses of different dimension. Specifically, if the press is greater in width, the only change in construction needed is to increase the space between the guide rails G and, of course, to commensurately increase the dimension of the boards (assuming, of course, that the apparatus is to permit full utilization of the press dimension, i. e., that at least some dies used in the press may be as large as the press).

If the dimension of the press platen is greater in the direction of the guide rails, the boards are increased in dimension to fit the larger size of press, and the diameter of sprocket wheel 106 is increased to produce a movement adequate for the increased dimension of the boards.

To insure equal movement of the boards at both sides of the apparatus, and in general, to produce a smooth and satisfactory operation of the mechanism, I prefer to make the chain and sprocket mechanism in duplicate, there being a sprocket chain at each of the guide rails. This construction will be evident from inspection of the drawing, and it will be understood that the drive shaft 10 extends from one side of the apparatus to the other, and carries the driving sprockets 106 in duplicate so as to insure equal movement for both chains.

Fig. 10 illustrates a further feature of the invention, namely its application to the deposit of a variety of differently shaped and properly placed pills in a mold having a single large cavity for forming a complex piece. Specifically, the mold 160 has a cavity 162 therein with a core at 164. The formation of the upper half of the mold is schematically indicated in broken lines, and is such as to produce a single large box piece having sides or flanges 166, a partition 168, a boss 170, and an annular flange 172. It would be difficult, if not impossible, to form so complex a piece out of a single pill. Instead, the pillboard B is loaded with pills 174 corresponding to the ends of the piece, a pill 176 corresponding to the partition, pills 178 and 180 corresponding to the long sides of the piece, a pill 182 providing material for the boss, and an annular pill 184 providing material for the annular flange. These pills are, of course, suitably dimensioned as to provide, in their total volume, adequate material for the complete molded piece with allowance for compression of the material during molding. The pills are loaded in the pillboard just as was previously described, and are retained by appropriately distributed spring fingers 186. When the pillboard moves over the mold, the stop 82 acts on the arm 74 and moves the upper lamination carrying the springs toward the left (as was described in connection with Fig. 8), thereby releasing all of the pills and depositing the same in proper relation to the mold cavity. The problem here being handled is an example of the advantage of using the spring finger pillboard of Figs. 6 through 8 in contrast with the simple sliding pillboard of Fig. 9, for the latter is not adapted to handle differently shaped and dimensioned and disposed pills, such as are illustrated in Fig. 10. An additional advantage of the spring finger pillboard is that it releases and drops the pills without causing the same to tip over.

Another advantage of the invention is in necessitating only a slight opening of the press. To load the variety of pills shown in Fig. 10 into a mold cavity by hand, would necessitate comparatively wide opening of the press so that the operator can manipulate the pills and see exactly where he places the same, all without burning his hands on the hot mold. Even the simple uniform array of pills shown in Fig. 1 necessitates a much wider opening of the press than is needed when using the present invention. With the present invention, the press need open only sufficiently to strip the molded product from the mold, for the pillboard readily slides between the halves of even a slightly opened mold and there quickly and properly discharges its load of pills.

Reverting now to Figs. 1 and 2, it may be mentioned that the downwardly sloping or dropped ends of the guide rails are preferably bent in two steps as shown, there being a first portion 146 and a final and much more abruptly dropped portion 148. This is not at all essential, but has the advantage of giving the catchboard a sudden drop or thump at the end of the movement from the second to the third position. This thump helps dislodge all of the molded pieces from the catchboard. It will be understood that a suitable box, basket or bin is provided at the dropped ends of the rails to catch the molded pieces as they are dumped from the catchboard.

The tilted part of the rail is in the present case made up of angle iron material, the inner end being secured to the main channel rails at 150, as is best shown at Fig. 11. The extension of angle iron is preferably braced by an extra strip 152 the inner end of which is secured to the bottom of the main rail at 154. The end of the sloping or dropped rail has been omitted in Fig. 11, but, of course, is the same as that illustrated in Fig. 2.

It is believed that the construction and operation of my improved apparatus for loading and emptying molding presses, as well as the many advantages thereof, will be apparent from the foregoing detailed description. It will also be apparent that while I have shown and described my invention in preferred forms, many changes and modifications may be made in the structures disclosed, without departing from the spirit of the invention defined in the following claims.

I claim:

1. The combination with a press having a mold, of mechanism to facilitate emptying the mold, said mechanism including guides extending through the press and a catchboard arranged for movement along the guides, said guides being inclined downwardly at one side of the press, whereby said catchboard is tilted downwardly when moved out of the press on the downwardly inclined guides, in order to dump the molded product therefrom.

2. The combination with a press having a mold, of mechanism to facilitate loading and emptying the mold, said mechanism including rails extending through the press, said rails being inclined downwardly at one side of the press and extending horizontally at the opposite side of the press, a catchboard arranged for movement along the rails, a pillboard arranged for movement along the rails, said pillboard having releasable means to hold a pill in proper relation for registration with a desired part of the mold, and means pivotally connecting said catchboard to said pillboard, whereby said catchboard is free to tilt downwardly when moved past the press on the downwardly inclined rails, in order to dump the molded product therefrom.

3. The combination with a press having a multiple cavity mold, of mechanism to facilitate loading and emptying the mold, said mechanism including rails extending through the press, said rails being inclined downwardly at one side of the press and extending horizontally at the opposite side of the press, a catchboard arranged for movement along the rails, a pillboard arranged for movement along the rails, said pillboard having releasable means to hold a number of pills in proper relation for registration with the cavities of the mold, means pivotally connecting said catchboard to said pillboard, whereby said catchboard is free to tilt downwardly when moved past the press on the downwardly inclined rails, in order to dump the molded pieces, and a stop for stopping the pillboard and releasing the pills when in registration with the mold.

4. A pillboard to facilitate loading a mold, said pillboard comprising superposed relatively movable laminations, both of said laminations being cut away to form openings so located as to hold a number of pills in proper relation for registration with desired parts of the mold, one of said laminations having resilient holding fingers at said openings, said fingers extending transversely of the laminations from the lamination carrying the same to a point in the plane of the second lamination, the arrangement being such that when the laminations are slightly relatively moved in one direction the resilient fingers operate to hold the pills in the second lamination, and when the laminations are slightly relatively moved in opposite direction, the pills are released.

5. The combination with a molding press having a heated mold for molding articles from a thermosetting plastic material delivered to the press as preformed pills, said mold having relatively vertically movable upper and lower parts, the upper part of said mold being provided with appropriate stripper means movable downwardly relative to the upper part of the mold, of mechanism to facilitate loading and emptying the mold, said mechanism including rails extending through the press, a catchboard of extensive area supported by and movable along the rails, said catchboard being adapted when moved into the press between the separated parts of the open mold to receive the molded articles stripped downwardly from the upper part of the mold, a pillboard supported by and movable along the rails for delivering pills to the mold, said pillboard having means to hold an array of pills in proper relation for registration with desired parts of the mold, and means to release all of the pills.

6. The combination with a molding press having a heated mold for molding articles from thermosetting plastic material delivered to the press as preformed pills, said mold having an array of mold cavities and the upper part of said mold being provided with appropriate stripper means, of mechanism to facilitate loading and emptying the mold, said mechanism including guides extending through the press, a catchboard supported by and movable along the guides, said catchboard being adapted when moved into the press to receive the molded articles stripped from the upper part of the mold, a pillboard supported by and movable along the guides for delivering pills to the mold, said pillboard having releasable means to hold an array of pills in proper relation for registration with the cavities of the mold, and means connecting said catchboard and pillboard together for simultaneous movement along the guides, said guides being of such length as to permit movement of both the pillboard and catchboard out of the press simultaneously.

7. The combination with a press having a heated multiple cavity mold for molding articles from thermosetting plastic material delivered to the press as preformed pills, the upper part of said mold being provided with appropriate stripper means, of mechanism to facilitate loading and emptying the mold, said mechanism including rails extending through the press, a catchboard arranged for movement along the rails, a pillboard arranged for movement along the rails, said pillboard having releasable means to hold a number of pills in proper relation for registration with the cavities of the mold, said rails being of such length as to permit withdrawal of both the catchboard and pillboard simultaneously out of the press, and means connecting said catchboard and pillboard together for simultaneous movement from a first position wholly at one side of the press, to a second position with the catchboard in the press, to a third position with the catchboard beyond the press and the pillboard in the press, and then back to the first position.

8. The combination with a press having a heated mold for molding articles from a thermosetting plastic material delivered to the press as preformed pills, the upper part of said mold being provided with appropriate stripper means, of mechanism to facilitate loading and emptying the mold, said mechanism including rails extending through the press, a catchboard arranged for movement along the rails, a pillboard arranged for movement along the rails, said pillboard having releasable means to hold an array of pills in proper relation for registration with desired parts of the mold, said rails being of such length as to permit withdrawal of both the catchboard and pillboard simultaneously out of the press, means connecting said catchboard and pillboard together for simultaneous movement from a first position wholly at one side of the press, to a second position with the catchboard in the press, to a third position with the catchboard beyond the press and the pillboard in the press, means for causing automatic dumping of the molded product from the catchboard, and means on the rails cooperating with means on the pillboard for causing release of the pills in the pillboard when the boards are moved to the third position.

9. The combination with a press having a multiple cavity mold for molding articles from plastic material delivered to the press as preformed pills, the upper part of said mold being provided with appropriate stripper means, of mechanism to facilitate loading and emptying the mold, said mechanism including rails extending through the press, a catchboard arranged for movement along the rails, a pillboard arranged for movement along the rails, said pillboard having releasable means to hold an array of pills in proper relation for registration with the cavities of the mold, means connecting said catchboard and pillboard together for simultaneous movement along the rails, said rails being of such length as to permit withdrawal of both the catchboard and pillboard out of the press, means for moving said catchboard and pillboard from a first position wholly at one side of the press, to a second position with the catchboard in the press, to a third position with the catchboard beyond the press and the pillboard in the press, and back to the first position, means for arresting the movement of said means at each of said positions, and means for causing automatic discharge of the molded pieces from the catchboard and for causing release of the pills from the pillboard when the boards are moved into the third position.

10. The combination with a molding press having a mold for molding articles from plastic material delivered to the press as preformed pills, the upper part of said mold being provided with appropriate stripper means, of mechanism to facilitate loading and emptying of the mold, said mechanism including sprocket chains extending through the press, a catchboard and a pillboard connected to said chains and arranged for movement thereby, said catchboard being adapted when moved into the press to receive the molded articles stripped from the upper part of the mold, said pillboard having releasable means to hold an array of pills in proper relation for registration with desired parts of the mold, guide sprocket wheels for supporting the chains, and driving sprocket wheels for moving the chains, said chains being long enough to permit complete withdrawal of both the catchboard and the pillboard from the press.

11. The combination with a heated molding press having a mold for molding articles from a thermosetting plastic material delivered to the press as preformed pills, the upper part of said mold being provided with approprate stripper means, of mechanism to facilitate loading and emptying of the mold, said mechanism including rails extending through the press, a catchboard and a pillboard arranged for movement along the rails, said catchboard being adapted when moved into the press to receive the molded articles stripped from the upper part of the mold, said pillboard having releasable means to hold an array of pills in proper relation for registration with desired parts of the mold, sprocket chains extending along the rails, guide sprocket wheels for supporting the chains, driving sprocket wheels for moving the chains, and means connecting the chains to the boards.

12. The combination with a molding press having a multiple cavity mold for molding articles from plastic material delivered to the press as preformed pills, the upper part of said mold being provided with appropriate stripper means, of mechanism to facilitate loading and emptying of the mold, said mechanism including rails extending through the press, a catchboard and a pillboard arranged for movement along the rails, said catchboard being adapted when moved into the press to receive the molded articles stripped from the upper part of the mold, said pillboard having releasable means to hold an array of pills in proper relation for registration with the cavities of the mold, sprocket chains extending along the rails for moving said boards, said rails and chains being long enough to permit complete withdrawal of both the catchboard and the pillboard from the press, guide sprocket wheels for supporting the chains, driving sprocket wheels for moving the chains, and means for rotating the driving sprocket wheels in such a manner as to move the catchboard and pillboard from a first position wholly at one side of the press, to a second position with the catchboard in the press, and then to a third position with the catchboard beyond the press and the pillboard in the press.

13. The combination with a molding press having a multiple cavity mold for molding articles from plastic material delivered to the press as preformed pills, the upper part of said mold being provided with appropriate stripper means, of mechanism to facilitate loading and emptying of the mold, said mechanism including rails extending through the press, a catchboard and a pillboard arranged for movement along the rails, said catchboard being adapted when moved into the press to receive the molded articles stripped from the upper part of the mold, said pillboard having releasable means to hold an array of pills in proper relation for registration with the cavities of the mold, sprocket chains extending along the rails for moving the boards, said rails and chains being long enough to permit complete withdrawal of both the catchboard and the pillboard from the press, guide sprocket wheels for supporting the chains, driving sprocket wheels for moving the chains, means for rotating the driving sprocket wheels in such a manner as to move the catchboard and pillboard from a first position wholly at one side of the press, to a second position with the catchboard in the press, and then to a third position with the catchboard beyond the press and the pillboard in the press, stops for arresting the movement at the said second and third positions, and means for causing automatic dumping of the molded pieces from the catchboard and for causing release of the pills from the pillboard in the third position.

14. The combination with a stationary molding press having a mold with relatively vertically movable upper and lower parts, the upper part of said mold being provided with an appropriate stripper means movable downwardly relative to the upper part of the mold, of mechanism to facilitate emptying the mold, said mechanism including stationary rails extending through the press, and a catchboard arranged for movement along the rails, said catchboard being adapted when moved into the press between the separated parts of the open mold to receive the molded articles stripped downwardly from the upper part of the mold, said rails being inclined downwardly at one end for automatically causing said catchboard to dump the molded articles therefrom.

15. The combination with a molding press having a heated mold for molding articles from thermosetting plastic material delivered to the press as preformed pills, said mold having an array of mold cavities, of mechanism to facilitate loading the mold cavities with the pills, said mechanism including rails extending through the press, a pillboard arranged for movement along the rails for delivering pills to the mold cavities, said pillboard having releasable means to hold an array of pills in proper relation for registration with the mold cavities, stop means for automatically stopping the pillboard against further movement through the press when the pills are in registration with the mold cavities, and means on the rails cooperating with means on the pillboard for automatically releasing all of the pills from the pillboard when in registration with the mold cavities.

16. The combination with a molding press having a mold for molding articles from plastic material delivered to the press as preformed pills, of mechanism to facilitate loading the mold with the pills, said mechanism including rails extending through the press just inside the pillars of the press, a pillboard arranged for movement along the rails for delivering pills to the mold, said pillboard having apertured laminations to hold a number of pills in proper relation for registration with desired parts of the mold, said laminations when relatively moved in one direction operating to hold the pills, and when relatively moved in opposite direction operating to release the pills, a fixed stop associated with said rails for automatically stopping the pillboard against further movement through the press when the pillboard is in registration with the mold, and means on said pillboard cooperating with said stop and moved relative to the other parts of the pillboard by said stop for relatively moving the laminations of the pillboard in order to release the pills into the mold.

17. The combination with a molding press having a heated mold for molding articles from a thermosetting plastic material delivered to the press as preformed pills, of mechanism to facilitate loading the lower part of the mold with the pills, said mechanism including rails extending through the press just inside the pillars of the press, a pillboard for movement along the rails, said pillboard having releasable means to hold an array of pills in proper relation for registration with desired parts of the mold, sprocket chains at said rails, sprocket wheels for supporting and moving said chains, means connecting said chains to said pillboard, and means for adjusting the connection of the chains to the pillboard to an extent at least equal to the pitch of the chains.

18. The combination with a molding press having a heated mold for molding articles from a thermosetting plastic material delivered to the press as preformed pills, said mold having relatively vertically movable upper and lower parts, the upper part of said mold being provided with appropriate stripper means movable downwardly relative to the upper part of the mold, of mechanism to facilitate loading and emptying the mold, said mechanism including rails extending through the press, a catchboard of extensive area supported by and movable along the rails, said catchboard being adapted when moved into the press between the separated parts of the open mold to receive the molded articles stripped downwardly from the upper part of the mold, a pillboard supported by and movable along the rails for delivering pills to the mold, said pillboard having means to hold an array of pills in proper relation for registration with desired parts of the mold, means to release all of the pills, and press control mechanism for opening the mold a relatively limited amount, insufficient for manual loading of the heated mold.

19. The combination with a molding press having a heated mold for molding articles from a thermosetting plastic material delivered to the press as preformed pills, said mold having relatively vertically movable upper and lower parts, the upper part of said mold being provided with appropriate stripper means movable downwardly relative to the upper part of the mold, of mechanism to facilitate loading and emptying the mold, said mechanism including rails extending through the press, a catchboard of extensive area supported by and movable along the rails, said catchboard being adapted when moved into the press between the separated parts of the open mold to receive the molded articles stripped downwardly from the upper part of the mold, a pillboard supported by and movable along the rails for delivering pills to the mold, said pillboard having means to hold an array of pills in proper relation for registration with desired parts of the mold, and means to release all of the pills, said pillboard comprising apertured laminations, said laminations when relatively moved in one direction operating to hold the pills, and when relatively moved in opposite direction operating to release the pills into the mold.

20. The combination with a molding press having a heated mold for molding articles from a thermosetting plastic material delivered to the press as preformed pills, said mold having relatively vertically movable upper and lower parts, the upper part of said mold being provided with appropriate stripper means movable downwardly relative to the upper part of the mold, of mechanism to facilitate loading and emptying the mold, said mechanism including rails extending through the press, a catchboard of extensive area supported by and movable along the rails, said catchboard being adapted when moved into the press between the separated parts of the open mold to receive the molded articles stripped downwardly from the upper part of the mold, a pillboard supported by and movable along the rails for delivering pills to the mold, said pillboard having means to hold an array of pills in proper relation for registration with desired parts of the mold, stop means for automatically stopping the pillboard against further movement through the press when the pills are in registration with the mold cavities, and means for automatically releasing all of the pills from the pillboard when in registration with the mold cavities.

GORDON B. SAYRE.